J. HARRIS, Jr.

Calculator.

No. 31,016.

Patented Jan. 1, 1861.

witnesses
H. L. Wainwright
Otis Tufts Jr.

Inventor
Joseph Harris Jr.

UNITED STATES PATENT OFFICE.

JOSEPH HARRIS, JR., OF ROXBURY, MASSACHUSETTS.

ADDING-MACHINE.

Specification of Letters Patent No. 31,016, dated January 1, 1861.

*To all whom it may concern:*

Be it known that I, JOSEPH HARRIS, Jr., of Roxbury, in the county of Norfolk and State of Massachusetts, have invented a new and useful Improvement in the Construction of Adding-Machines, which enables me to ascertain the sum of any number of figures correctly and with greater facility than any apparatus for that purpose now in use.

This result is accomplished by means of a series of revolving wheels provided with pins and spring escapements acting together in connection with an inclined plane.

To enable others skilled in the art, to make and use my invention, I will now give a clear and complete explanation of its mode of construction and operation.

To avoid unnecessary prolixity, the model and drawings accompanying this application represent but three revolving wheels, which are severally designated as follows: The first or right hand wheel is called the units wheel, the second or middle one the tens, the third or left hand is called the hundreds. The same arrangement may be extended to any number of wheels.

Figure 1:
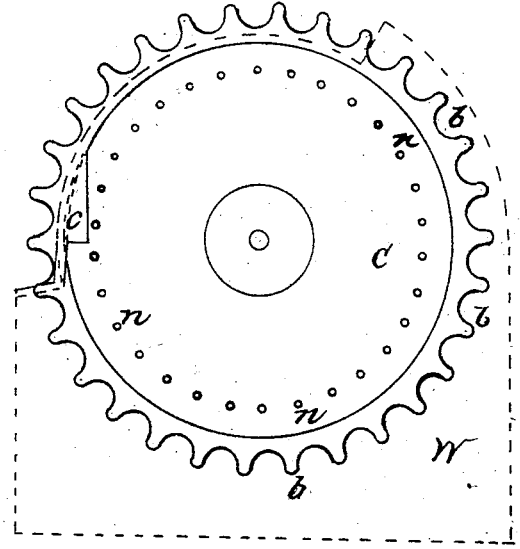
Figure 3:
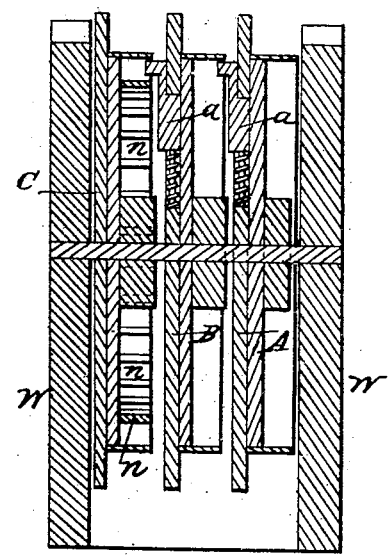
Figure 2:
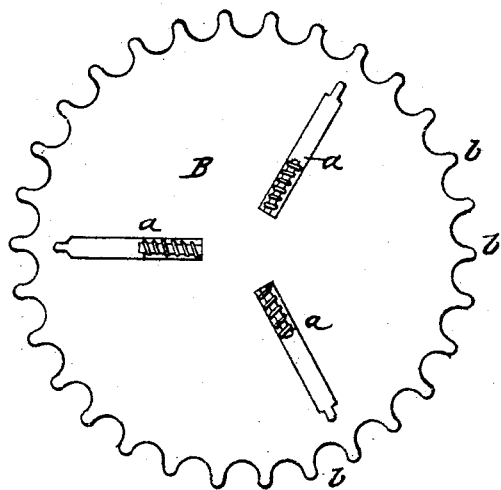
Figure 4:
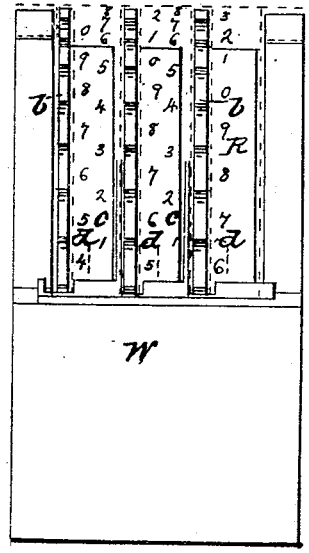

Figure 1 represents an elevation of the hundreds wheel C and one side of the frame W in red ink behind it. The units and tens wheels are here supposed to be removed. Fig. 2 is a side elevation of the tens wheel B showing the spring escapements $a, a, a$. Fig. 3 is a vertical section through the length of the axis and frame, illustrating the relative position of the wheels when arranged for operating. Fig. 4 is a front elevation of the apparatus. The red lines show the dial R and dial figures outside, and the dark lines show the wheels with their index plates and figures inside.

The wooden projections $b, b$, etc., resembling cogs are intended only for turning the wheels, by placing the fore finger on them. The graduations of the indices of the wheels and dial are so made that a projection corresponds with the figure immediately above.

Suppose we set the machine at 456 and wish to add 539 to it; the 4, 5, and 6 are seen through their respective holes $d\ d$ in the dial plate. Commence with the units wheel A, and bring the projection $b$ next below the figure 9, down even or opposite the rest or angle in the frame. The springs $a\ a$, etc., are each placed half way in the interval between the 0 and 1 on the graduated index of the wheels when a spring comes in contact with an inclined plane C, it is compressed so that instead of continuing to traverse a circumference outside the pins $n, n$, etc., it pushes a tens pin $n$ one graduation ahead, and the figure 6 takes the place of the figure 5, as seen through the hole $d$ in the dial plate; while 5 takes the place of 6 on the index plate of the units wheel. Now on the tens wheel bring down the projection immediately below the figure 3 on the dial index, so that it will stand opposite the rest or angle in the frame, and the figure 9 on the tens wheel will appear through the corresponding hole of the dial plate. Next, pursue the same operation with the hundreds wheel and we find 9 occupies the place of 4 formerly.

In mental addition we carry one or more to the next left hand column; but in my machine, the same operation is accomplished by the revolution of the next left hand wheel. This result is not arrived at by a like arrangement of mechanical powers working in any machine now in use.

What I claim as new and desire to secure by Letters Patent is—

The spring escapement movement $a$ in connection with the pins $n, n$, and inclined plane $c$ working in the manner and for the purpose herein described.

JOSEPH HARRIS, JR.

Witnesses:
OTIS TUFTS, Jr.,
H. A. WAINWRIGHT.